United States Patent [19]

Kress et al.

[11] Patent Number: 5,474,406
[45] Date of Patent: Dec. 12, 1995

[54] CUTTING PLATE FOR A REAMER

[75] Inventors: Dieter Kress, Aalen; Friedrich Häberle, Lauchheim, both of Germany

[73] Assignee: MAPAL Fabrik für Präzisionswerkzeuge Dr. Kress KG, Aalen, Germany

[21] Appl. No.: 263,279

[22] Filed: Jun. 21, 1994

[30] Foreign Application Priority Data

Jun. 21, 1993 [DE] Germany .......................... 43 20 511.9

[51] Int. Cl.⁶ .................................................. B23B 51/00
[52] U.S. Cl. ........................ 408/199; 407/114; 407/116; 408/713
[58] Field of Search .......................... 408/199, 231–233, 408/713, 223, 224, 227; 407/113–116

[56] References Cited

U.S. PATENT DOCUMENTS 4,850,757  7/1989  Stashko ............................ 408/199

*Primary Examiner*—Steven C. Bishop
*Attorney, Agent, or Firm*—Anderson Kill Olick & Oshinsky

[57] ABSTRACT

A cutting plate for a reamer for fine machining of metal workpieces including a main cutting edge, an auxiliary cutting edge, an apex point at which the auxiliary cutting edge is connected with the main cutting edge, and a chip deflecting surface limited by a chip deflecting step having a high point located opposite a region of the apex point, a first region associated with the main cutting edge and descending, starting from the high point, away from the main cutting edge, and a second region associated with the auxiliary cutting edge and extending relative to the auxiliary cutting edge at an angle of from 0° to about 10°.

22 Claims, 2 Drawing Sheets

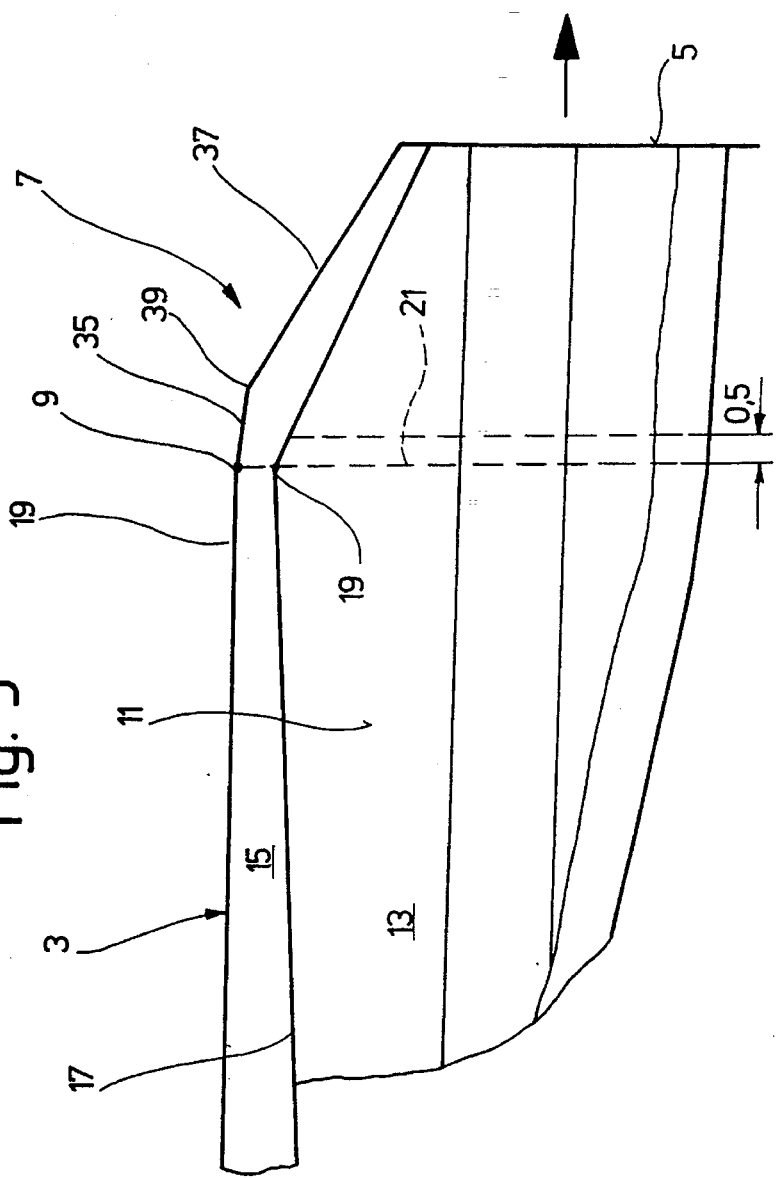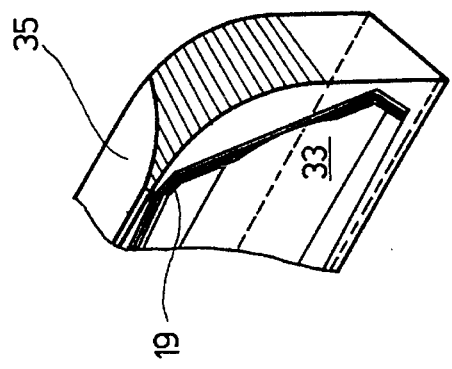

CUTTING PLATE FOR A REAMER

BACKGROUND OF THE INVENTION

The present invention relates to a cutting plate for a reamer for fine machining of metal workpieces and having main and auxiliary cutting edges and chip deflecting surfaces associated with the cutting edges and limited by a chip deflecting step.

During fine machining of a metal workpiece with a reamer, very thin chips are produced having a thickness of less than 0.01 mm. Because they are very hard they break with difficulty and, as a result, long chips are produced which cause scratches on the machined surfaces, especially during precise fine machining.

It is known to provide the cutting plates for reamers with chip deflecting steps to facilitate breaking of the chips. The chips, which are carried away from the cutting edges along the chip deflecting surface, strike the chip deflecting step and are curled by the step. However, despite the use of a chip deflecting step, the chips remain long enough to adversely affect the result of the fine machining.

Accordingly, the object of the invention is a cutting plate for a reamer which would assure that, during fine machining, short chips will be produced.

SUMMARY OF THE INVENTION

This and other objects of the invention, which will become apparent hereinafter, are achieved by providing a chip deflecting step having a high point located opposite the apex point of the cutting edges and having a first region associated with the main cutting edge and descending, from the high point, away from the main cutting edge and a second region associated associated with the auxiliary cutting edge and extending parallel or at a small acute angle relative thereto. The arranging of the high point of the chip deflecting step beneath the apex point of the cutting edges especially facilitates breaking of the chips, which results in the production of short chips.

Advantageously, the main cutting edge is formed of two portions extending at different angles to the central line or axis of the cutting plate. With such a main cutting edge the chip deflecting step is formed so that, as it has already been discussed above, its region associated with the main cutting edge descends, starting from the high point, gradually away from the cutting edge.

According to another embodiment of the cutting plate of the present invention, the cutting plate has an arcuate main cutting region. In this case, the first region of the chip deflecting step has two portions extending at different angles relative to the cutting plate axis. Such configuration of the chip deflecting step also facilitates the production of short chips during fine machining.

Finally, the chip deflecting step, according to the present invention, is characterized in having a height of about 0.1 mm. Providing such a small height of the chip deflecting step means that, during the production of cutting plates, only a small amount of material need be removed from the cutting face of the cutting plate during its grinding. Thus, the cutting plates, according to the present invention, can be produced very economically.

BRIEF DESCRIPTION OF THE DRAWINGS

The objects and features of the present invention will become more apparent, and the invention itself will be best understood, from the following detailed description of the preferred embodiments when read with reference to the accompanying drawings, wherein:

FIG. 2 shows a perspective view of the operating side of the cutting plate shown in FIG. 1; and FIG. 3 shows a schematic plan view of a second embodiment of a cutting plate according to the present invention.

DETAILED DESCRIPTION OF THE PREFERRED EMBODIMENTS

Figure 1:
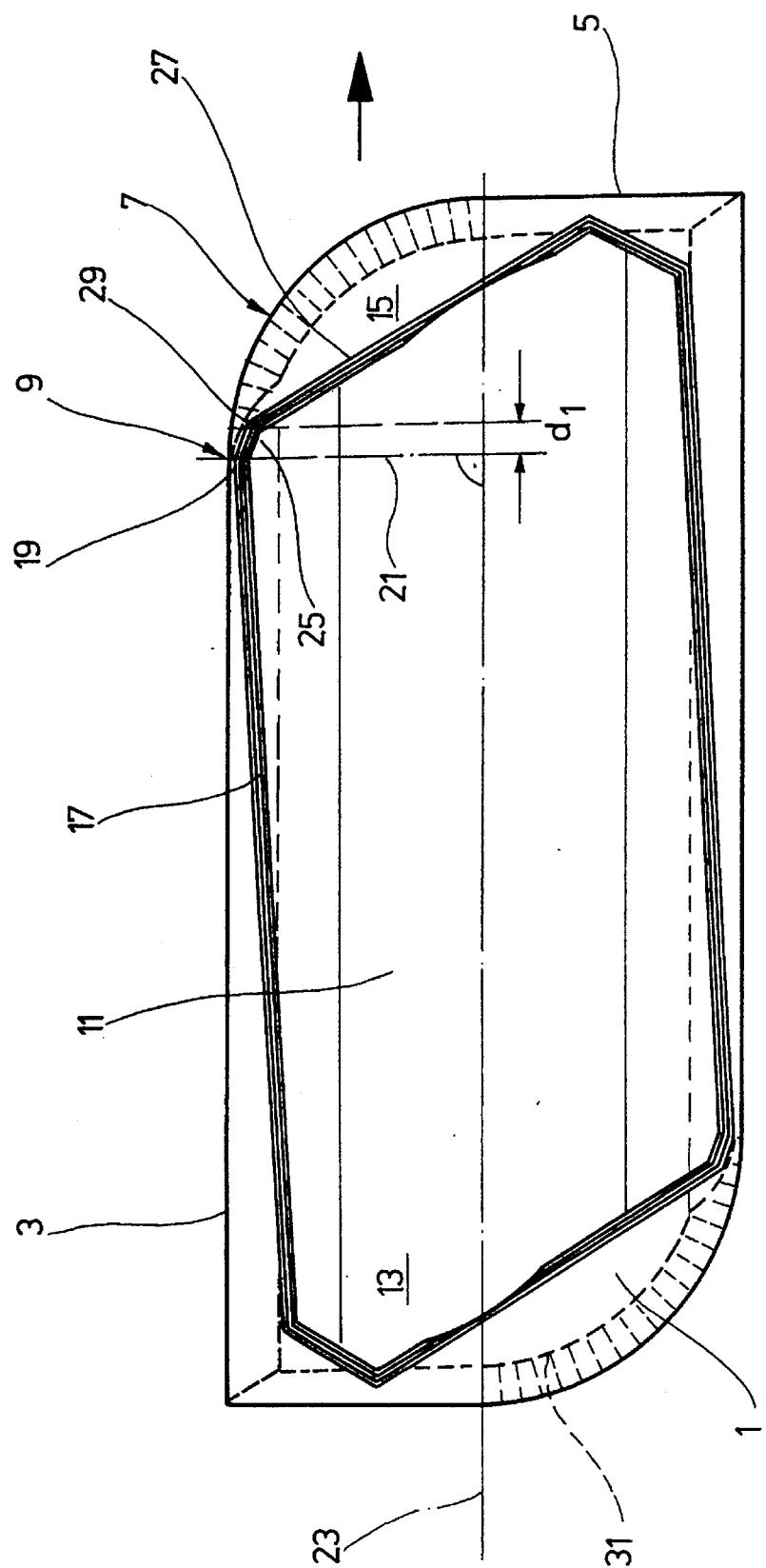
FIG. 1 shows a plan view of a first embodiment of a cutting plate according to the present invention.

FIG. 1 shows a cutting plate, according to the present invention, for a precision finishing tool, in particular for a reamer, which is used for machining a surface of a bore wall. To this end, the cutting plate is secured to a reamer head in a known manner so that the cutting plate projects beyond the circumferential surface of the reamer head. As known, a rotatable reamer is advanced into a machined bore and cuts off a thin chip having a thickness of less than 0.01 mm. The cutting plate 1, which is shown in FIG. 1, is secured in the reamer so that a longitudinal edge 3 extends substantially parallel to the rotational axis of the tool, with an end face edge 5 of the cutting plate 1 advancing in a direction designated with an arrow.

The longitudinal edge 3 of a substantially rectangular cutting plate 1 merges over a circular region into the end face edge 5 forming an arcuate transitional region of a main cutting edge 7 of the cutting plate 1. The transition between the main cutting edge 7 and the longitudinal edge 3, which forms an auxiliary cutting edge, takes place at an apex point 9 which forms, with the cutting plate 1 being secured in the reamer, the outmost radial point of the reamer.

On the visible upper surface of the cutting plate 1, so-called cutting face 11 in FIG. 1, there is provided an elevation 13. The elevation 13 is formed as a result of the grinding of the region of the cutting face 11 bordering the cutting edges, with the grinding resulting in forming front faces 15 surrounding the elevation 13. It is also possible to obtain an elevation with a sintering technique. The side bordering edges of the elevation 13 form a chip deflecting step 17, which would be discussed in detail below.

The cutting plate 1, shown in FIG. 1, is formed as a turnover plate, that is the upper and right outer edge of the cutting plate, i.e., the longitudinal edge 3, the arcuate region of the main cutting edge 7 and the end face edge 5 of the cutting plate 1 are identical to the diagonally opposite side of the cutting plate 1. This also means that the cutting plate 1 can be rotated by 180° about an axis extending perpendicular to the cutting face 11 when the above-mentioned longitudinal, main cutting and end face edges become blunt as a result of machining workpieces. However, it is not absolutely necessary to form the cutting plate 1 as a turnover plate.

The left rear side of the cutting plate 1 does not play any role in forming the main cutting edge 7 and the adjacent longitudinal auxiliary edge 3 and, therefore, their shape is unimportant. However, by forming the cutting plate 1 as a turnover plate, it can be used more effectively, that is, more economically.

Further discussion would refer only to the longitudinal or auxiliary edge 3, the end face edge 5 and the main cutting edge 7.

The chip deflecting step 17 does not extend rectilinear along the total region of the main and auxiliary edges of the cutting plate 1. Rather, it has a high point 19 located most closely to the associated cutting edge. The remaining regions of the chip deflecting step 17 are spaced from respective cutting edges a larger distance. In the cutting plate 1, shown in FIG. 1, the high point 19 is associated with the apex point 9 of the cutting edges of the cutting plate 1. That is, the apex point 9 is located immediately above the high point 19 so that both points lie on an imaginable line 21 which intersects the axis 23 of the cutting plate 1 at an angle of 90°, otherwise, is perpendicular thereto.

The distance between the apex point 9 and the high point 19, taken along the line 21, depends on the material of the machined workpiece. For steel workpieces, the distance between the high point 19 and the apex point 9 is selected between 0.3 mm and 0.7 mm, preferably 0.5 mm. For alumininum workpieces, the distance is selected between 0.5–1.0 mm, preferably 0.8 mm.

The chip deflecting step can extend parallel to the longitudinal or auxiliary edge 3. It is possible, however, as shown in FIG. 1, to have the chip deflecting step 17 extending at an angle to the longitudinal edge 3 with the angle apex being located closely adjacent to the end surface edge 5 of the cutting plate 5. In FIG. 1, the chip deflecting step is characterized in that it has, in the region of the arcuate main cutting edge 7, two portions 25 and 27 extending at two different inclination angles. The portion 25 of the chip deflecting step 17 extends in the direction toward the end face edge 5 at an angle, relative to the axis 23 10°–30°, in particular at 15°–25°. Especially preferable is an angle of 20°.

In the region of the portion 27, the chip deflecting step 17 is characterized by a rather steep inclination. In this region, the chip deflecting step extends to the direction toward the end face edge 5 at an angle, relative to the axis 23, of 40°–80°, preferably 50°–70°. Especially preferable is an angle of about 60°.

The chip deflecting step 17 is also characterized by two salient points. The first salient point coincides with high point 19 of the chip deflecting step 17 and lies directly opposite the apex point 9 of the cutting plate 1. To the right, that is, in the region of the main cutting edge 7, the chip deflecting step 17 has a second salient point 29 which defines an apex point of an angle formed by portions 25 and 27 of the chip deflecting step 17.

The second salient point 29 is spaced from the high point 19 in the direction toward the end face edge 5 a distance $d_1$ of about 0.5 mm. This also means that the portion 25 is substantially shorter than the portion 27 which extends practically from the second salient point 29 up to the end face edge 5 of the cutting plate 1.

As can be seen in FIG. 1, the chip deflecting step 17, in the region of the longitudinal or auxiliary edge 3, extends at a small angle thereto. That means the chip deflecting step 17 is inclined, with respect to the axis 23, at a smaller angle than in the region of the main cutting edge 7 where the chip deflecting step 17 has a portion 25 inclined to the axis 23 at an angle of preferably 20°, and a second portion 27 inclined to the axis 23 at an angle of preferably 60°. The inclination angle of the chip deflecting step 17 in the region of the auxiliary edge 3 is about 0°–10°, preferably 1°–5°. In particular, an angle of about 3° is preferable.

Because of the rear relief angle, the rear side of the cutting plate 1 is smaller than its front side. This is shown by dash lines 31.

FIG. 2 shows a perspective view of the upper right edge of the cutting plate 1 shown in FIG. 1. In FIG. 2, the elements identical to those of FIG. 1 are designated with the same reference numerals to facilitate understanding.

The cutting plate 1 as shown in FIG. 2 has, adjacent to the axis 23, a chip groove 33 having a substantially V-shaped cross-section. The side limiting surfaces 35 of the cutting plate are inclined horizontally to form the clearance angle.

As can be seen in FIG. 2, the chip deflecting step 17 is smallest in the region adjacent to the axis 23. Adjacent to the high point 19, its height is about 0.05 mm–0.3 mm, preferably 0.1 mm. Because of the small height of the chip deflecting step 17, a very small amount of the material of the cutting plate 1 need be removed in the region of the front faces 15 which form, in the embodiment shown in FIG. 2, a continuous surface.

FIG. 3 shows another embodiment of a cutting plate according to the present invention, of which only an upper right portion is shown. This cutting plate can also be formed as a tetragonal turnover plate with diagonally opposite edges formed as shown in FIG. 3.

The cutting plate 1, shown in FIG. 3, is preferably formed as a rectangular plate having an upper, substantially horizontal longitudinal edge 3 which forms an auxiliary cutting edge of the cutting plate 1 of FIG. 3. The main cutting edge is connected with the longitudinal edge at the apex 9 and is inclined downward therefrom. The main cutting edge has a first portion 35 inclined with respect to an imaginable continuation of the longitudinal edge 3 at an angle of 3°, and a second portion 37 inclined at an angle of 30°. The first and second portions 35 and 37 are connected at a salient point 39.

The chip deflecting step 17 is formed by an elevation 13 formed upon grinding of the cutting face 11 and surrounded with front faces 15. The sides of the elevation 13 form the chip deflecting step 17.

As in the embodiment of the cutting plate shown in FIG. 1, the chip deflecting step 17 of the cutting plate 1 shown in FIG. 3 has a high point 19 in the region adjacent to the transitional region between the auxiliary and the main cutting edge. The high point 19 is located most closely to the cutting edge region. In the region of the main cutting edge, i.e., in the region of portions 35 and 37, the respective portion of the chip deflecting step 17 is practically rectilinear. This portion has an inclination angle of 10°–30°, in particular an angle of 15°–25°. The most preferable inclination angle of this portion is, however, an angle of 20°.

In the embodiment of FIG. 3, the region of the chip deflecting step 17 which is associated with the main cutting edge, is substantially rectilinear so that the chip deflecting step has only one salient point, high point 19 and not two as the chip deflecting step of the cutting plate shown in FIG. 1.

The chip deflecting step region associated with the auxiliary edge 3 is inclined relative thereto and forms an angle therewith having an apex point pointing toward the end face edge 5. However, this region may form an angle of 0° with the edge 3, that is, it can extend parallel thereto. However, preferably it should extend at an angle of 1°–10°, more preferably at an angle of 2°–5°, and most preferably at an angle of 3°.

As in the embodiment of FIG. 1, it is important in the embodiment of FIG. 3, that the high point 19 lies beneath the apex point 9, with both points lying on an imaginary line 21 extending perpendicular to the axis (not shown) of the cutting plate.

As in the embodiment of FIG. 1, the distance between points 9 and 19 depends on the material of the machined workpiece. The distance between points 9 and 19 in the embodiment shown in FIG. 3 is substantially the same as that in the embodiment shown in FIG. 1. In both embodiments of FIGS. 1 and 3, the chip deflecting step 17 can extend along a curved line with the curve center being located far outside of the base body of the cutting plate.

The chip deflecting step described with reference to the embodiments of a cutting plate shown in FIGS. 1 and 3 can be used in cutting plates of another kind. The important thing is to have the high point of the chip deflecting step located beneath the apex point of the cutting plate, with the distance therebetween being selected dependent on the machined material and with the apex point being the outermost radial point of the cutting plate when it is secured in a reamer. The apex point can be determined, e.g., by providing an imaginable tangent to the cutting edge of the cutting plate. Starting from the high point, the chip deflecting step extends further away from the cutting edge, at least in the region of the main cutting edge, that is the distance between respective points of the cutting edge and the chip deflecting step increases.

In the region of the auxiliary cutting edge, the course of the chip deflecting step is so selected that the chip deflecting step extends parallel to the auxiliary cutting edge or extends relative thereto at a small acute angle. In every case, however, the chip deflecting step has a salient point which defines a high point.

A further salient point of the course of the chip deflecting step can be formed by providing two portions forming an angle therebetween. Such form of the chip deflecting step is especially advantageous for cutting plates, the main cutting edge of which is arcuate as in the cutting plate shown in FIG. 1.

The chip deflecting step having a configuration described herein can be used in triangular cutting plates or other polygonal cutting plates, e.g., in a hexagonal cutting plate. To provide for optimal removal of chips, the inclination angle of the chip deflecting step, in the region associated with the relatively long auxiliary cutting edge and/or in the region associated with the main cutting edge, should be selected dependent on the material of the machined workpieces. It has been established that with different materials during reaming, small chips are produced and the height of the chip deflecting step may be 0.1 mm, which is very small in comparison with conventional cutting plates which may have a height more than 0.3 mm.

While the present invention was shown and described with reference to the preferred embodiments, various modifications thereof will be apparent to those skilled in the art and, therefore, it is not intended that the invention be limited to the disclosed embodiments and/or details thereof, and departures may be made therefrom within the spirit and scope of appended claims.

What is claimed is:

1. A cutting plate for a reamer for fine machining of metal workpieces, said cutting plate comprising:

a main cutting edge;

an auxiliary cutting edge;

an apex point at which said auxiliary cutting edge is connected with said main cutting edge; and a chip deflecting surface limited by a chip deflecting step having a high point located opposite a region of the apex point of said main and auxiliary cutting edges, wherein said chip deflecting step has a first region associated with said main cutting edge and descending, starting from said high point, away from said main cutting edge, and a second region associated with said auxiliary cutting edge and extending relative to said auxiliary cutting edge at an angle of from 0° to about 10°.

2. A cutting plate as set forth in claim 1, wherein said second region of said chip deflecting step forms with said auxiliary cutting edge an angle of more than 0° with an angle apex being located adjacent to said main cutting edge.

3. A cutting plate as set forth in claim 1, wherein said main cutting edge have first and second portions extending at different angles relative to an axis of said cutting plate.

4. A cutting plate as set forth in claim 3, wherein said cutting plate has a forward end face edge, wherein said first cutting portion extends adjacent to said forward end face edge and at an angle of about 30° to the axis of said cutting plate, and wherein said second portion extends between said first portion and said apex point and at an angle of about 3° to the axis of said cutting plate.

5. A cutting plate as set forth in claim 4, wherein said first region of said chip deflecting step extends from said high point in a direction toward said forward end face edge and at an angle of 10°–30° relative to the axis of said cutting plate.

6. A cutting plate as set forth in claim 5, wherein said first region of said chip deflecting step extends at an angle of 15°–25° relative to the axis of said cutting plate.

7. A cutting plate as set forth in claim 5, wherein said first region of said chip deflecting step extends at an angle of 20° relative to the axis of said cutting plate.

8. A cutting plate as set forth in claim 1, wherein said main cutting edge has an arcuate configuration.

9. A cutting plate as set forth in claim 8, wherein said first region of said chip deflecting step has a first portion extending from said high point in a direction toward a forward end face edge of said cutting plate at an angle of about 10°–30° relative to an axis of said cutting plate, and a second portion extending from said first portion of said first region at an angle of about 40°–80° to the axis of said cutting plate.

10. A cutting plate as set forth in claim 8, wherein said first region of said chip deflecting step has a first portion extending from said high point in a direction toward a forward end face edge of said cutting plate at a first angle of about 15°–25° relative to an axis of said cutting plate, and a second portion extending from said first portion of said first region at a second angle of about 50°–70° to the axis of said cutting plate.

11. A cutting plate as set forth in claim 10, wherein said first angle is 20°, and said second angle is 60°.

12. A cutting plate as set forth in claim 11, wherein said first portion of said first region of said chip deflecting step is substantially shorter than said second portion of said first region of said chip deflecting step.

13. A cutting plate as set forth in claim 12, wherein a length of projection of said first portion of said first region on a line extending parallel to the axis of said cutting plate is about 0.5 mm.

14. A cutting plate as set forth in claim 1, wherein said chip deflecting step has a height of 0.05 to 0.3 mm at said high point.

15. A cutting plate as set forth in claim 14, wherein said height is 0.1 mm.

16. A cutting plate as set forth in claim 1, wherein said cutting plate is formed as a turnover plate and has identical diagonally opposite cutting regions formed each of said main and auxiliary cutting edges.

17. A cutting plate as set forth in claim 1, wherein said cutting plate has a substantially rectangular configuration and a longitudinal edge defining said auxiliary cutting edge.

18. A cutting plate as set forth in claim 1, wherein a distance between said apex and high points is selected dependent on a material of a machined workpiece.

19. A cutting plate as set forth in claim 18, wherein said distance, when the material of the machined workpiece is steel, is from 0.3 mm to 0.7 mm.

20. A cutting plate as set forth in claim 19, wherein said distance is about 0.5 mm.

21. A cutting plate as set forth in claim 18, wherein said distance, when the material of the machined workpiece is aluminum, is from 0.5 mm to 1.0 mm.

22. A cutting edge as set forth in claim 21, wherein said distance is about 0.8 mm.

* * * * *